United States Patent [19]

Noack

[11] 4,047,471
[45] Sept. 13, 1977

[54] LOCKING MEANS FOR PISTON PIN

[75] Inventor: Wolfgang-Hermann Noack, Heilbronn, Germany

[73] Assignee: Karl Schmidt GmbH, Neckarsulm, Germany

[21] Appl. No.: 656,667

[22] Filed: Feb. 9, 1976

[30] Foreign Application Priority Data

Mar. 27, 1975   Germany .............................. 2513579

[51] Int. Cl.² ................................................ F16J 1/18
[52] U.S. Cl. ...................................... 92/187; 403/154
[58] Field of Search .................. 92/187, 238; 403/154, 403/155; 29/156.5 A, 156.5 R; 164/DIG. 8

[56] References Cited

U.S. PATENT DOCUMENTS

| 2,213,884 | 9/1940 | Ohmart | 403/155 X |
| 2,295,199 | 9/1942 | Carvelli | 92/238 X |
| 2,709,628 | 5/1955 | Valentine | 403/154 X |
| 3,479,929 | 11/1969 | Fangman | 92/187 |

FOREIGN PATENT DOCUMENTS

| 714,400 | 11/1941 | Germany | 403/154 |
| 454,407 | 9/1936 | United Kingdom | 403/154 |
| 278,487 | 10/1927 | United Kingdom | 403/154 |

Primary Examiner—Irwin C. Cohen
Attorney, Agent, or Firm—Burgess, Dinklage & Sprung

[57] ABSTRACT

Locking means for a piston pin is loosely mounted in the bosses of a piston and which piston is larger in outside diameter than the external distance between the bosses. At least one angled locking pin having one arm secured in the boss and extending approximately parallel to the axis of the boss is provided and the other arm of the locking pin is bent so as to extend before the opening of the boss.

2 Claims, 1 Drawing Figure

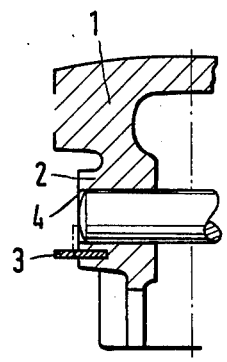

LOCKING MEANS FOR PISTON PIN

BACKGROUND

This invention relates to locking means for a piston pin which is loosely mounted in the bosses of a piston, which piston is larger in outside diameter than the external distance between the bosses.

The piston pin connects the piston and the connecting rod and must transmit the forces which act between these members. The outside dimensions of the piston pin are determined by the dimensions of the piston and the strength properties of the pin material.

To prevent contact between the piston pin and the cylinder wall during the operation of the engine, the piston pin must be locked against axial movement. Such lock will be inherently provided if the piston pin is clamped to the connecting rod. In connection with floating piston pins, which are loosely mounted in the bosses and in the connecting rod small end bearing, it is conventional to use locking means which consist of round wire or sheet steel and which are externally mounted on both ends of the piston pin and snap into registering locking grooves provided on the periphery of the bosses. Locking rings tending to expand radially are usually employed. The locking rings may particularly consist of circlips in accordance with DIN 472 or of wire snap rings in accordance with DIN 73 120. The manufacturing tolerances result in an axial play of the piston pin between the two locking rings mounted in the bosses. In small pistons this play is about 0.4 - 0.1 mm.

It is also known to insert a mushroom-shaped light-alloy element into the bore of the piston at each open end thereof so that said element extends along the cylinder wall.

The snap rings and circlips must be compressed and must then be inserted into the bosses until the rings snap into the circumferential grooves formed in the bosses. Such rings must have the required diameter even when they have been compressed several times. An additional disadvantage which must be tolerated is that the external distance between the bosses must exceed the length of the piston pin so that the space required for the locking rings or mushroom-shaped locking elements is available in each boss. Where locking rings are used, it is necessary to cut grooves into the bosses and also to clean the grooves before the locking rings are inserted so that a uniform contact is ensured and a subsequent loosening of the locking rings in operation is precluded. Besides, the rings can be inserted only with special pliers in order to ensure that the locking ring will not suffer permanent deformation before it is inserted. It is apparent that the manufacture of the piston pin-locking means and the insertion of such means involve a comparatively large expenditure.

SUMMARY

This invention provides piston pin-locking means which permit of a substantial decrease of the expenditure described above, and which particularly eliminate the need for cutting grooves into the bosses.

This is accomplished by the provision of at least one angled locking pin, which has one arm that is secured in the boss to extend approximately parallel to the axis of the boss whereas the other arm of the locking pin is bent to extend before the opening of the boss.

DESCRIPTION

The locking pin is first embedded in a straight form in each boss of the piston during the casting thereof, and when the piston pin has been inserted the free end of the locking pin is bent up to extend before the opening of the boss. This results in simple piston pin-locking means requiring no loose parts. These locking means can be made without a particularly large expenditure and can be used to lock the piston pin against axial movements, particularly in pistons for internal combustions engines of lawn mowers, small compressors, motor saws etc. Besides, the boss may be shorter than in conventional pistons.

The piston pin-locking means according to the invention is shown on the drawing, which is a fragmentary longitudinal sectional view taken through the pin axis of a piston. A piston 1 formed with a window is provided with a locking pin 3, which in a straight configuration has been embedded in the boss 2 during the casting of the piston to extend parallel to the axis of the boss. When the piston pin has been inserted into the bosses 4, the non-embedded portion of each locking pin is bent to extend before the opening of the boss as indicated by the dash-dot line.

What is claimed is:

1. In a piston having bosses with openings and a piston pin loosely mounted in the bosses and wherein the piston has a larger outside diameter than the external distance between the bosses, comprising: at least one locking pin means for each boss opening for securing the piston pin in the bosses, said locking pin means being fabricated from a bendable material and having one arm cast embedded into the external surface of the boss and extending substantially parallel to the axis of the boss opening and another arm connected to said one arm and having a length greater than the distance of the one arm to the boss opening and bent to extend before the opening of the boss to block axial movement of the piston pin.

2. In a piston according to claim 1, wherein the two arms are integral.

* * * * *